(12) United States Patent
Pline

(10) Patent No.: US 10,384,570 B2
(45) Date of Patent: Aug. 20, 2019

(54) CHILD-SEAT RESTRAINT SYSTEM

(71) Applicant: Ford Global Technologies, LLC, Dearborn, MI (US)

(72) Inventor: Kevin Michael Pline, Plymouth, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 115 days.

(21) Appl. No.: 15/490,338

(22) Filed: Apr. 18, 2017

(65) Prior Publication Data

US 2018/0297496 A1   Oct. 18, 2018

(51) Int. Cl.
*B60N 2/28* (2006.01)
*B60N 2/64* (2006.01)

(52) U.S. Cl.
CPC .......... *B60N 2/2809* (2013.01); *B60N 2/286* (2013.01); *B60N 2/64* (2013.01)

(58) Field of Classification Search
CPC .... B60N 2/2809; B60N 2/265; B60N 2/2803; B60N 2002/2818; B60N 2002/2812
See application file for complete search history.

(56) References Cited

U.S. PATENT DOCUMENTS

| | | | |
|---|---|---|---|
| 4,491,344 A | 1/1985 | Fohl | |
| 5,580,126 A * | 12/1996 | Sedlack | B60N 2/265 297/250.1 |
| 6,030,047 A * | 2/2000 | Kain | B60N 2/2812 297/250.1 |
| 6,390,560 B1 | 5/2002 | Gandhi et al. | |
| 6,517,154 B2 | 2/2003 | Sawamoto | |
| 7,246,852 B2 * | 7/2007 | Balensiefer | B60N 2/2851 297/250.1 |
| 7,387,336 B2 * | 6/2008 | Sakumoto | B60N 2/2812 297/250.1 |
| 8,141,950 B2 | 3/2012 | Boyer | |
| 8,662,582 B2 | 3/2014 | Hall et al. | |
| 9,302,645 B1 * | 4/2016 | Shenaq | B60R 22/20 |
| 9,493,099 B2 | 11/2016 | Ruthinowski | |
| 9,663,032 B1 * | 5/2017 | Appukutty | B60Q 9/00 |
| 2002/0000744 A1 * | 1/2002 | Maciejczyk | B60N 2/2809 297/254 |
| 2002/0043830 A1 * | 4/2002 | Sawamoto | B60N 2/2809 297/216.11 |

(Continued)

FOREIGN PATENT DOCUMENTS

| | | | | |
|---|---|---|---|---|
| DE | 4412981 C1 * | 8/1995 | | B60N 2/265 |
| DE | 19945680 A1 * | 4/2001 | | B60N 2/2806 |

(Continued)

OTHER PUBLICATIONS

GB Search Report dated Oct. 15, 2018 re GB Appl. No. 1806085.5.
UK Search Report dated Mar. 25, 2019 re GB 1806085.5 (3 pages).

*Primary Examiner* — Timothy J Brindley
(74) *Attorney, Agent, or Firm* — Frank A. MacKenzie; Bejin Bieneman PLC

(57) ABSTRACT

A restraint system includes a seatback having a top end portion; a retainer attached to the top end portion; a tether attachment bracket movable between a first position retained by the retainer and a second position below the first position along the seatback; and a spring coupled to the seatback and the tether attachment bracket and biasing the tether attachment bracket to the second position.

20 Claims, 5 Drawing Sheets

(56) References Cited

U.S. PATENT DOCUMENTS

| | | | |
|---|---|---|---|
| 2002/0043836 A1* | 4/2002 | Maciejczyk | B60N 2/2809 297/250.1 |
| 2003/0047972 A1* | 3/2003 | Burleigh | B60N 2/2809 297/216.11 |
| 2004/0051356 A1* | 3/2004 | Neelis | B60N 2/2809 297/253 |
| 2005/0206150 A1 | 9/2005 | Yamaguchi et al. | |
| 2007/0069510 A1* | 3/2007 | Suyama | B60R 21/207 280/733 |
| 2008/0290644 A1 | 11/2008 | Spahn et al. | |
| 2010/0033001 A1* | 2/2010 | Boyer | B60N 2/2806 297/253 |
| 2010/0109215 A1* | 5/2010 | Ruthinowski | B60N 2/2809 267/140.13 |
| 2010/0301658 A1* | 12/2010 | Furas | B60N 2/2806 297/463.1 |
| 2011/0057432 A1 | 3/2011 | You et al. | |
| 2012/0119479 A1* | 5/2012 | Parker | B60N 2/2809 280/807 |
| 2012/0126597 A1* | 5/2012 | Hall | B60N 2/2809 297/250.1 |
| 2014/0265472 A1* | 9/2014 | Love | B60N 2/2887 297/216.11 |
| 2018/0208085 A1* | 7/2018 | Renaudin | B60N 2/2809 |

FOREIGN PATENT DOCUMENTS

| | | | | |
|---|---|---|---|---|
| DE | 102005019029 A1 * | 10/2006 | | B60N 2/2806 |
| DE | 102013225791 A1 | 6/2015 | | |
| EP | 0667256 A2 * | 8/1995 | | B60N 2/286 |
| EP | 1393966 A2 * | 3/2004 | | B60N 2/2809 |
| FR | 2868023 A1 * | 9/2005 | | B60N 2/2809 |
| FR | 294182 A1 | 7/2010 | | |
| FR | 2941182 A1 * | 7/2010 | | B60N 2/2809 |
| FR | 2993216 A1 * | 1/2014 | | B60N 2/2809 |
| FR | 3002887 B1 * | 6/2016 | | B60N 2/2809 |
| GB | 2277494 A | 11/1994 | | |
| JP | 3129045 B2 * | 1/2001 | | B60N 2/2809 |
| JP | 2001191827 A * | 7/2001 | | B60N 2/2809 |
| JP | 2003312335 | 11/2003 | | |
| WO | WO-2012146743 A1 * | 11/2012 | | B60N 2/2809 |

* cited by examiner

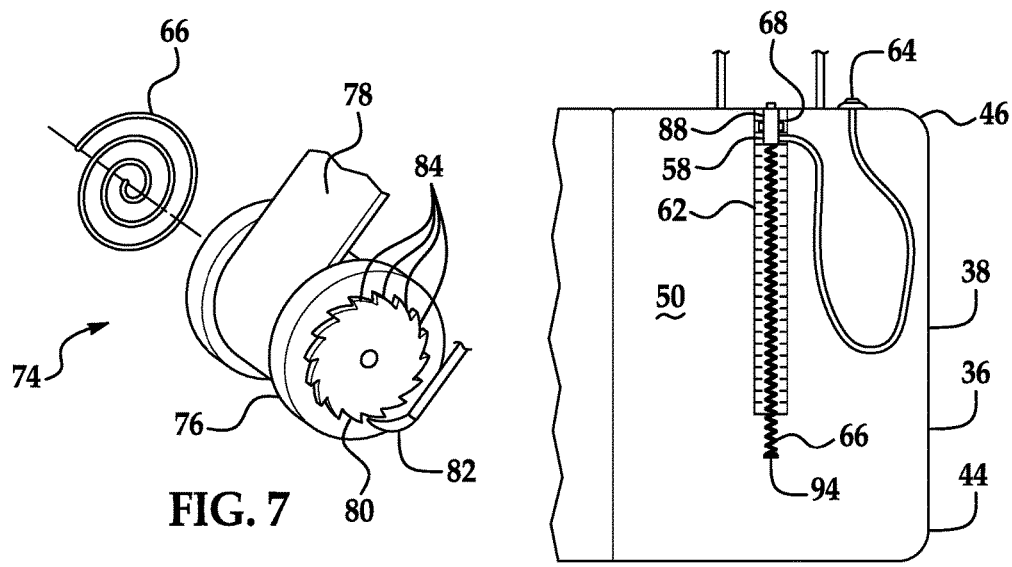
FIG. 7
FIG. 8
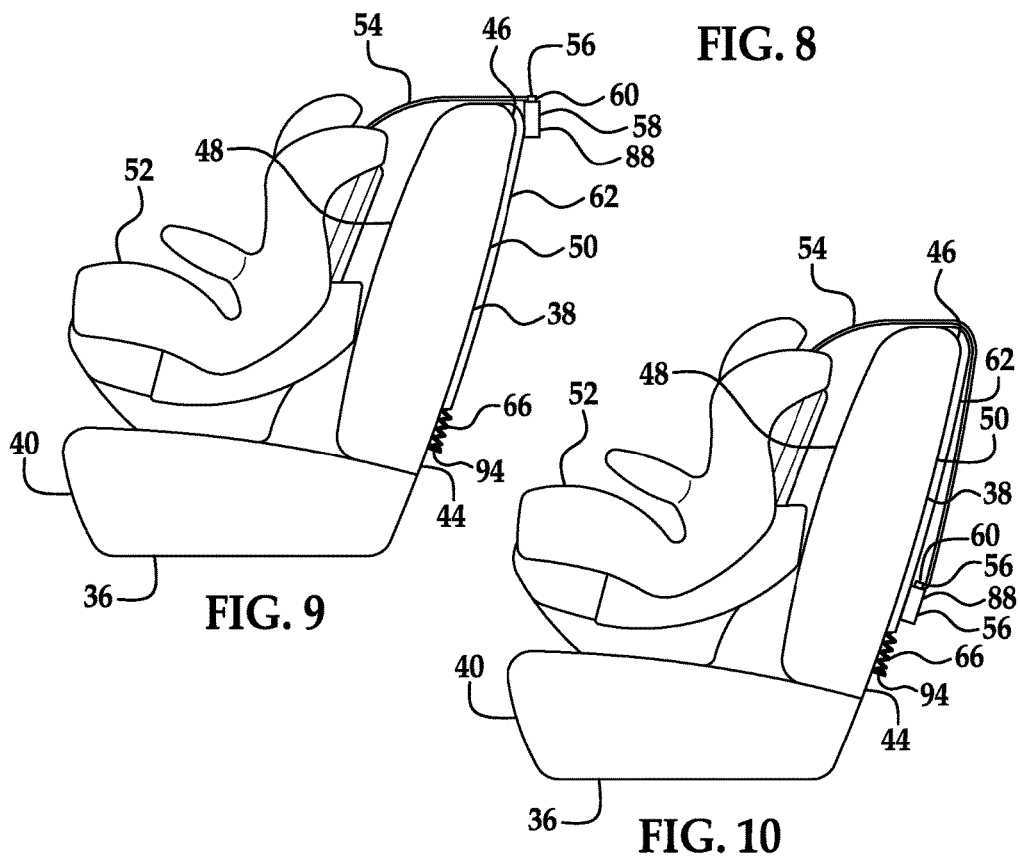
FIG. 9
FIG. 10

CHILD-SEAT RESTRAINT SYSTEM

BACKGROUND

Child seats are removable seats for seating and restraining children riding in a vehicle. Types of child seats include rearward-facing child seats, forward-facing child seats, combination seats that can face rearward or forward, and booster seats. Rearward-facing, forward-facing, and combination child seats include a harness for restraining the child occupant. Booster seats rely on the seatbelts included with the vehicle. Child seats may be held in place by the seatbelt of the vehicle and/or may include tethers for attaching to tether attachment brackets of the vehicle.

Vehicles include lower and upper tether attachment brackets. The lower tether attachment brackets are located between the seat bottom and the seatback. The upper tether attachment brackets are located on one of a ceiling of the vehicle behind the seat; a rear shelf if the vehicle is a sedan; a back wall if the vehicle is a pickup truck; a back side or underside of the seat if the seat is reinforced; or a floor behind the seat if the vehicle is a station wagon, hatchback, minivan, or sport utility vehicle.

BRIEF DESCRIPTION OF THE DRAWINGS

FIG. 7 is a perspective view of a retractor of the first embodiment of the restraint system.

FIG. 8 is a rear view of the seat in the passenger cabin having a second embodiment of the restraint system.

FIG. 9 is a side view of the seat with the tether attachment bracket of the second embodiment of the restraint system in the first position.

FIG. 10 is a side view of the seat with the tether attachment bracket of the second embodiment of the restraint system in the second position.

DETAILED DESCRIPTION

Figure 1:
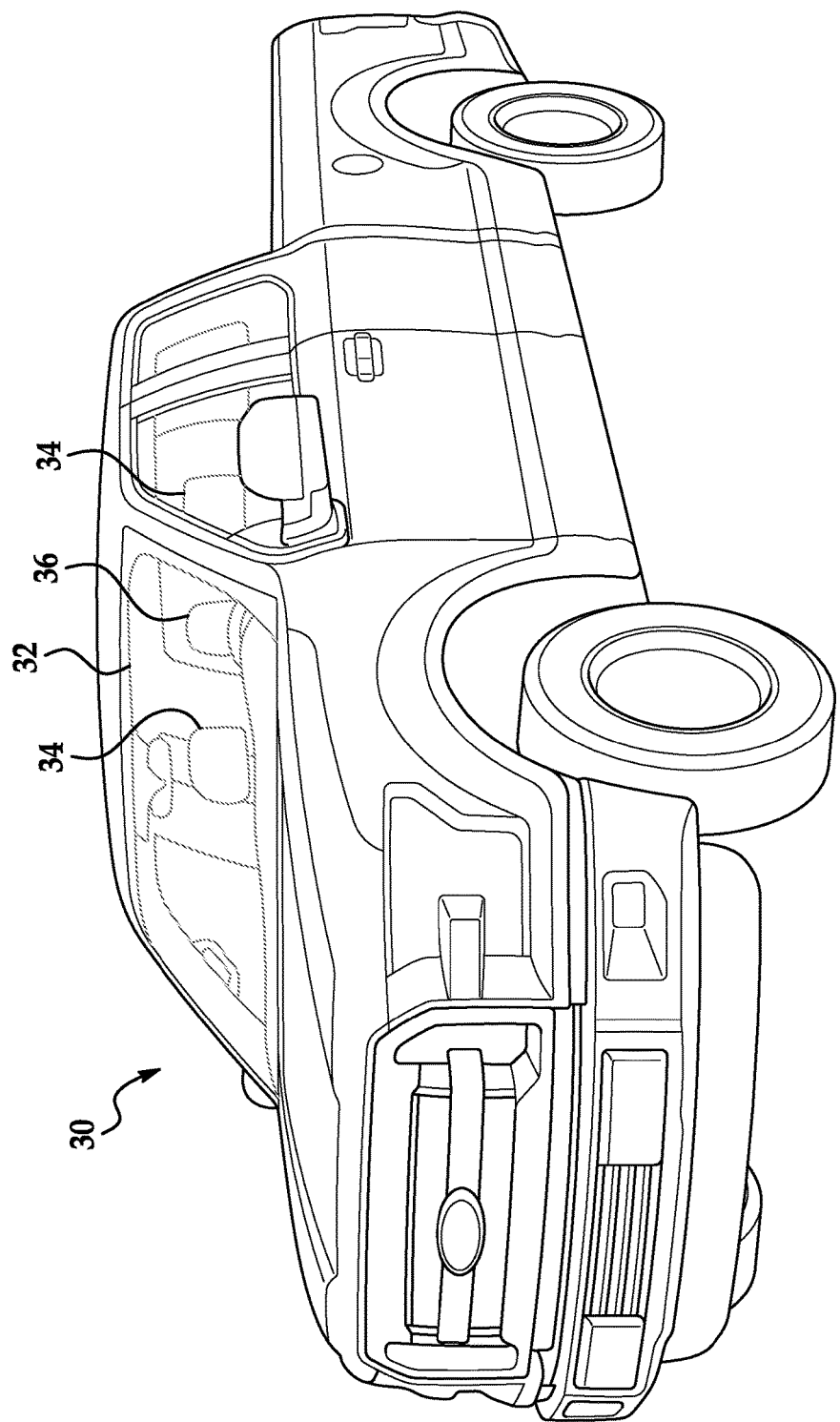
FIG. 1 is a perspective view of a vehicle.

A restraint system includes a seatback having a top end portion; a retainer attached to the top end portion; a tether attachment bracket movable between a first position retained by the retainer and a second position below the first position along the seatback; and a spring coupled to the seatback and the tether attachment bracket and biasing the tether attachment bracket to the second position.

The restraint system may include a seat bottom coupled to the seatback. The seatback may have a back side facing away from the seat bottom, and the tether attachment bracket in the second position may be disposed alongside the back side of the seatback.

The tether attachment bracket may have a U-hook.

A retractor may be coupled to the seatback, and webbing may be coupled to the retractor and to the tether attachment bracket. The spring may be a torsion spring coupled to the retractor. The retractor may have a locked state preventing extraction of the webbing and an unlocked state allowing extraction of the webbing. The restraint system may include a button attached to the top end portion of the seatback and in communication with the retractor. The button may have a depressed position and an undepressed position. The button in the depressed position may switch the retractor to the unlocked state, and the button in the undepressed position may switch the retractor to the locked state. The retractor may include a spool about which the webbing is wound, a ratchet fixed to the spool, and a pawl in communication with the button and movable against or spaced from the ratchet. The restraint system may include a Bowden cable connecting the button to the pawl.

The restraint system may include a track extending from the retainer along the seatback. The tether attachment bracket may include a carriage that is slidable along the track. The restraint system may include a pin connected to and retractable relative to the carriage. The track may include a plurality of slots sized to receive the pin. The spring may be a linear spring extending parallel to the track. The restraint system may include a button attached to the top end portion of the seatback and in communication with the pin. The button may have a depressed position and an undepressed position. The pin may be movable between a retracted position and an extended position relative to the carriage. The button in the depressed position may move the pin to the retracted position, and the button in the undepressed position may move the pin to the extended position. The restraint system may include a Bowden cable connecting the button and the pin.

A restraint system includes a seatback having a top end portion; a tether attachment bracket movable between a first position at the top end portion and a second position below the first position along the seatback; a worm gear engaged with the tether attachment bracket; and a motor drivably connected to the worm gear.

The seatback may have a back side facing away from a seat bottom, and the tether attachment bracket in the second position may be disposed alongside the back side of the seatback.

The restraint system provides an upper tether attachment bracket for installing a child seat in a pickup truck. The restraint system is intuitive to use and provides adequate tension on a top tether of the child seat. The tether attachment bracket in the first position is easily visible to a human operator who is installing the child seat, as opposed to tether attachment brackets located on the back wall of the vehicle. Furthermore, the restraint system does not require feeding the top tether of the child seat through a loop before attaching the top tether to the tether attachment bracket. Thus, a human operator is more likely to correctly install the child seat. Moreover, the tether attachment bracket in the second position is spaced from the child seat far enough to tension the tether of the child seat.

Figure 2:
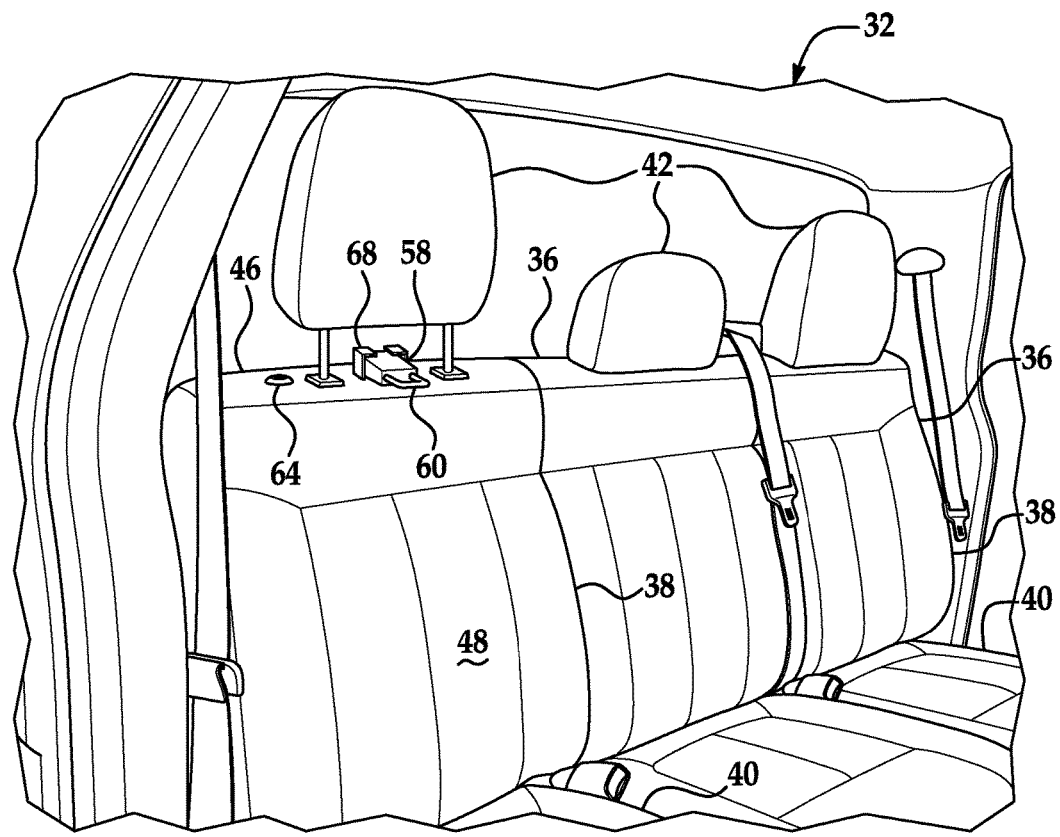
FIG. 2 is a perspective view of a portion of a passenger cabin of the vehicle.
Figure 3:
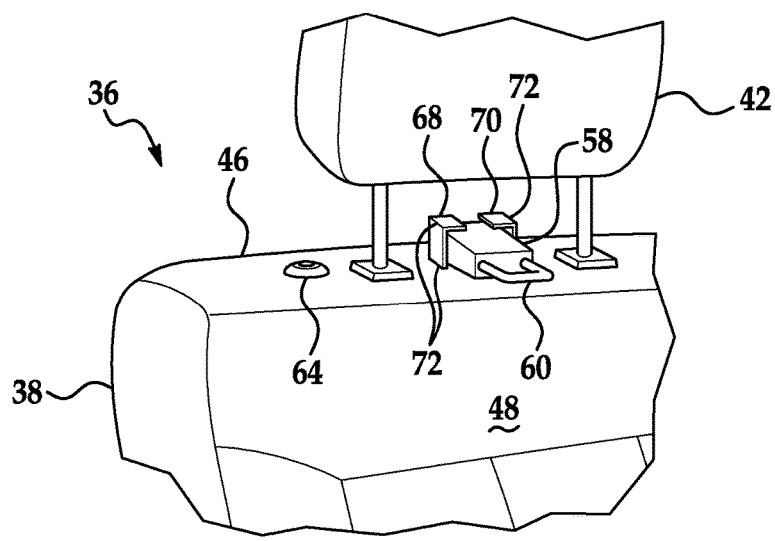
FIG. 3 is a perspective view of a portion of a seat in the passenger cabin having a restraint system.
Figure 4:
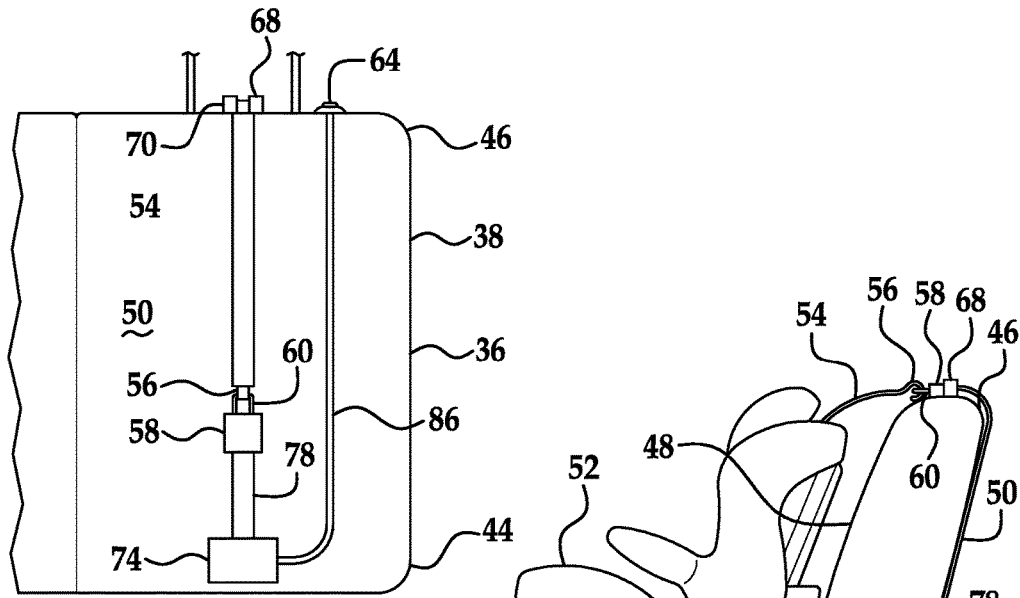
FIG. 4 is a rear view of the seat in the passenger cabin having a first embodiment of the restraint system.
Figure 5:
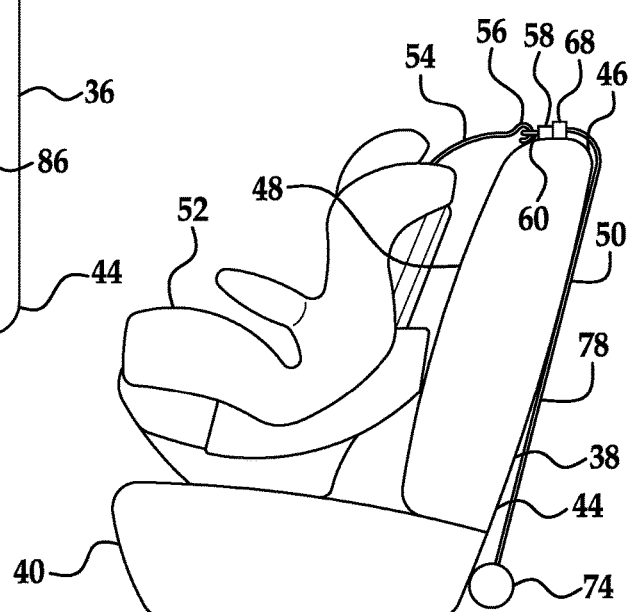
FIG. 5 is a side view of the seat with a tether attachment bracket of the first embodiment of the restraint system in a first position.
Figure 6:
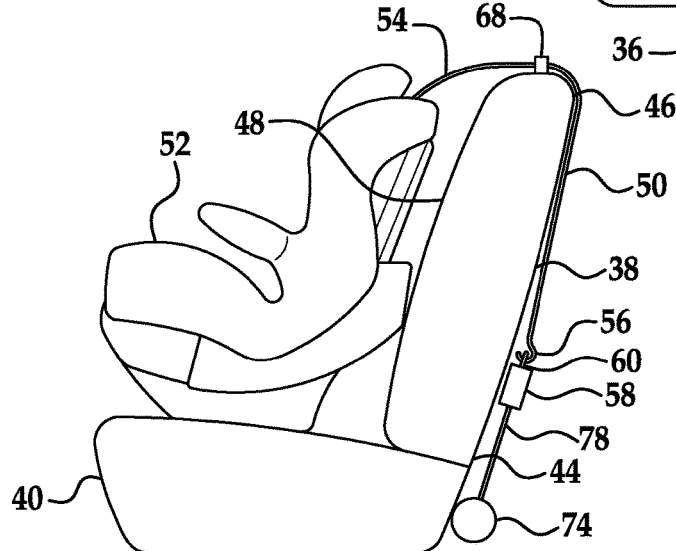
FIG. 6 is a side view of the seat with the tether attachment bracket of the first embodiment of the restraint system in a second position.
Figure 11:
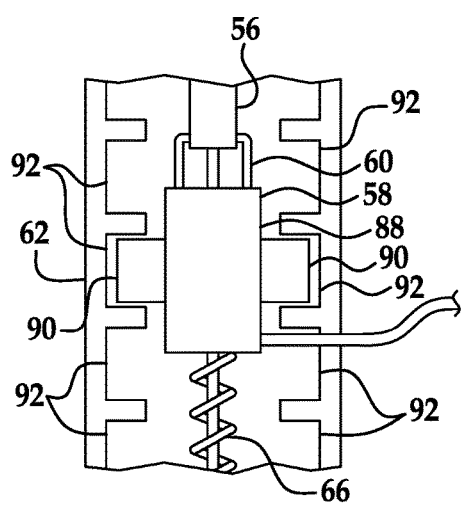
FIG. 11 is a plan view of a portion of the second embodiment of the restraint system.

With reference to FIGS. 1 and 2, the vehicle 30 includes a passenger cabin 32 to house occupants, if any, of the vehicle 30. The passenger cabin 32 includes one or more front seats 34 disposed at a front of the passenger cabin 32 and one or more back seats 36 disposed behind the front seats 34. The passenger cabin 32 may also include third-row seats (not shown) at a rear of the passenger cabin 32. In FIG. 1, the back seats 36 are shown to be a bench seat, but the seats may be other types. The position and orientation of the seats and components thereof may be adjustable by an occupant.

With reference to FIGS. 2, 5, 6, 9, 10, 13, and 14, each of the seats may include a seatback 38, a seat bottom 40, and a headrest 42. The headrest 42 may be supported by the seat back and may be stationary or movable relative to the seatback 38. The seatback 38 may be supported by the seat bottom 40 and may be stationary or movable relative to the seat bottom 40. The seatback 38, the seat bottom 40, and/or the headrest 42 may be adjustable in multiple degrees of freedom. Specifically, the seatback 38, the seat bottom 40, and/or the headrest 42 may themselves be adjustable, in other words, adjustable components within the seatback 38, the seat bottom 40, and/or the headrest 42, and/or may be adjustable relative to each other.

With reference to FIGS. 2, 4-6, 8-10, and 12-14, the seatback 38 extends from a bottom end portion 44 to a top end portion 46. The bottom end portion 44 is coupled to the seat bottom 40, and the top end portion 46 is directed away from the seat bottom 40. The seatback 38 has a front side 48 and a back side 50. The front side 48 faces toward the seat bottom 40, and a back of an occupant sitting in the back seat 36 contacts the front side 48. The back side 50 faces away from the seat bottom 40 and away from an occupant sitting in the seat. The front side 48 and the back side 50 extend from the bottom end portion 44 to the top end portion 46.

With reference to FIGS. 5, 6, 9, 10, 13, and 14, a child seat 52 may be placed in the back seat 36. The child seat 52 is not a component of the vehicle 30. Specifically, the child seat 52 may be as a forward-facing child seat, that is, a child seat in which a child occupant faces forward relative to the back seat 36. The child seat 52 may include a harness (not shown) for restraining a child occupant of the child seat 52. The child seat 52 may include one or more tethers attachable to the vehicle 30, including a top tether 54. The top tether 54 may extend from a top of the child seat 52 and may include a clip 56. The clip 56 may have, e.g., a hooklike shape.

With reference to FIGS. 2-6 and 8-14, the vehicle 30 includes a tether attachment bracket 58. The tether attachment bracket 58 provides a location for attaching the top tether 54 of the child seat 52 to the vehicle 30, in other words, for anchoring the child seat 52. For example, the tether attachment bracket 58 may have a U-hook 60, that is, a hook forming an arc between two attachment points. The clip 56 may be attachable to the U-hook 60, for example, by hooking the U-hook 60.

The tether attachment bracket 58 is movable between a first position retained by a retainer 68 and a second position below the first position along the seatback 38. The first and second positions may be disposed alongside the back side 50 of the seatback 38; in other words, the seatback 38 may be between the tether attachment bracket 58 and the seat bottom 40. The first position may be adjacent the top end portion 46 of the seatback 38. The first position may be between the headrest 42 and the seatback 38. The second position may be closer to the bottom end portion 44 than the first position. When the top tether 54 is attached to the tether attachment bracket 58, the top tether 54 may be slack when the tether attachment bracket 58 is in the first position and taut when the tether attachment bracket 58 is in the second position.

With reference to FIGS. 8-14, a track 62 may extend from the first position to the second position. The track 62 may have a constant cross-section along a straight or curved path between the first position and the second position. The tether attachment bracket 58 may have a shape matching the constant cross-section. The track 62 may prevent the tether attachment bracket 58 from deviating from the path between the first and second positions. Alternatively, the tether attachment bracket 58 may be free to move between the first and second positions.

With reference to FIGS. 3, 4, 8, and 12, a button 64 may be attached to the top end portion 46 of the seatback 38. The button 64 may be movable between a depressed position and an undepressed position. The button 64 may be biased to the undepressed position, in other words, may move from the depressed position to the undepressed position when no force is exerted on the button 64. The button 64 may control the operation of the restraint system, as described in more detail with respect to particular embodiments below.

With reference to FIGS. 3-6 and 8-10, first and second embodiments of the restraint system may include a spring 66 and the retainer 68. The spring 66 may be coupled to the seatback 38 and to the tether attachment bracket 58. The spring 66 may bias the tether attachment bracket 58 to the second position.

The retainer 68 may be attached the top end portion 46 of the seatback 38. When the tether attachment bracket 58 is placed in the retainer 68, the tether attachment bracket 58 is in the first position, and the retainer 68 may prevent the tether attachment bracket 58 from moving to the second position despite the bias of the spring 66. The retainer 68 may include a back wall 70, which may be disposed between the first and second positions and may block the tether attachment bracket 58 from moving from the first position to the second position. The retainer 68 may include one or more side walls 72, which may extend from the back wall 70. The side walls 72 may block the tether attachment bracket 58 from moving along the back wall 70.

To use the restraint system, a human operator puts the child seat 52 in the back seat 36. The human operator may attach a lower tether (not shown) to a hook (not shown) between the seat bottom 40 and the seatback 38. The tether attachment bracket 58 is in the first position, held in place by the retainer 68. The human operator attaches the top tether 54 to the tether attachment bracket 58. The human operator then pushes the button 64, and the tether attachment bracket 58 moves from the first position to the second position, pulling the top tether 54 taut. The tension in the top tether 54 holds the child seat 52 in place.

FIGS. 4-7 illustrate a first embodiment of the restraint system. The first embodiment includes a retractor 74 coupled to the seatback 38. The retractor 74 may include a spool 76 about which webbing 78 is wound, the spring 66, and a ratchet 80 and pawl 82. The first embodiment may include or omit the track 62.

With reference to FIG. 7, the retractor 74 includes the spool 76 about which the webbing 78 is wound. The spool 76 may be rotatably coupled to the seat, specifically the seatback 38. The spool 76 may rotate about an axis oriented laterally relative to the seat. The spool 76 may have a cylindrical shape.

The webbing 78 may be coupled to the tether and to the tether attachment bracket 58. Specifically, one end of the webbing 78 may be attached to the tether attachment bracket 58, and another end may be attached to the spool 76, with the webbing 78 wound about the spool 76 beginning at that end. The webbing 78 may be formed of fabric in, e.g., the shape of a strap.

The spring 66 is a torsion spring. The spring 66 is coupled to the retractor 74. Specifically, the spring 66 may be coupled to the spool 76 and to the seatback 38. The spring 66 may bias the spool 76 to a position in which the webbing 78 is wound such that the tether attachment bracket 58 is in the second position or is below the second position.

The ratchet 80 may be fixed to the spool 76 and may thus rotate with the spool 76. The ratchet 80 may have a series of teeth 84 arranged radially. The pawl 82 may be movable against or spaced from the ratchet 80, that is, between an engaged position against the ratchet 80 and a disengaged position spaced from the ratchet 80. In the engaged position, the pawl 82 rests against the teeth 84 of the ratchet 80. The teeth 84 of the ratchet 80 may be angled such that the pawl 82 in the engaged position may slip over the teeth 84 when the spool 76 rotates in a direction retracting the webbing 78, e.g., in the clockwise direction in FIG. 7, but catch the teeth 84 when the spool 76 rotates in a direction extracting the webbing 78, e.g., in the counterclockwise direction in FIG. 7. In the disengaged position, the pawl 82 may be spaced from the ratchet 80, allowing the spool 76 to rotate in either direction, retracting or extracting the webbing 78.

The button 64 may be in communication with the retractor 74, e.g., via a cable 86 such as a Bowden cable. Specifically, the cable 86 may connect the button 64 to the pawl 82. The cable 86 may translate the position of the button 64 to the position of the pawl 82. When the button 64 is in the undepressed position, the pawl 82 is in the engaged position. When the button 64 is in the depressed position, the pawl 82 is in the disengaged position.

The retractor 74 has a locked state preventing extraction of the webbing 78 and an unlocked state allowing extraction of the webbing 78. The button 64 in the depressed position switches the retractor 74 to the unlocked state, and the button 64 in the undepressed position switches the retractor 74 to the locked state. Specifically, the button 64 in the undepressed position moves the pawl 82 to the engaged position, preventing the spool 76 from rotating in the direction of extraction of webbing 78. The button 64 in the depressed position moves the pawl 82 to the disengaged position, allowing the spool 76 to rotate in either direction, thus allowing the webbing 78 to be extracted, e.g., by the human operator.

FIGS. 8-11 illustrate a second embodiment of the restraint system. The second embodiment includes a carriage 88 of the tether attachment bracket 58 movable along the track 62 between the first and second positions. The tether attachment bracket 58 includes the carriage 88 that is slidable along the track 62. The carriage 88 may have a cross-section mateable to the cross-section of the track 62. The carriage 88 may slide along the track 62 on a path between the first and second positions, and the track 62 may prevent the carriage 88 from deviating from the path.

One or more pins 90 may be connected to and retractable relative to the carriage 88. Each pin 90 may be movable between a retracted position and an extended position. In the extended position, the pin 90 extends from the carriage 88. In the retracted position, the pin 90 is at least partially retracted into the carriage 88 relative to the extended position.

The track 62 may include a plurality of slots 92 sized to receive the pins 90. When the pins 90 are in the extended position, the pins 90 may extend into the slots 92, and the slots 92 may block the pins 90, and thus the tether attachment bracket 58, from moving along the path. When the pins 90 are in the retracted position, the pins 90 are spaced from the slots 92, and the slots 92 do not prevent the tether attachment bracket 58 from moving. The retainer 68 may be the topmost slot 92 or pair of slots 92, in other words, the slots 92 that the pins 90 occupy when the tether attachment bracket 58 is in the first position.

The spring 66 may be a linear spring extending parallel to the track 62. The spring 66 may be coupled to the tether attachment bracket 58, specifically to the carriage 88, and to a linear-spring anchor 94. The linear-spring anchor 94 may be fixed to the seatback 38 and located below the second position of the tether attachment bracket 58 relative to the seatback 38. The spring 66 may be in tension when the tether attachment bracket 58 is above the second position.

The button 64 may be in communication with the tether attachment bracket 58, e.g., via the cable 86 such as a Bowden cable. Specifically, the cable 86 may connect and put in communication the button 64 and the pins 90. The cable 86 may be flexible; specifically, the cable 86 may be sufficiently flexible to bend between connecting the button 64 to the tether attachment bracket 58 in the first position and connecting the button 64 to the tether attachment bracket 58 in the second position.

The cable 86 may translate the position of the button 64 to the positions of the pins 90. The button 64 in the depressed position may move the pins 90 to the retracted position, and the button 64 in the undepressed position may move the pins 90 to the extended position. The button 64 in the undepressed position thus blocks the tether attachment bracket 58 from moving between the first and second positions along the path. The button 64 in the depressed position allows the tether attachment bracket 58 to move between the first and second positions; for example, a human operator may pull the tether attachment bracket 58 toward the first position, and the spring 66 may pull the tether attachment bracket 58 toward the second position.

Figure 12:
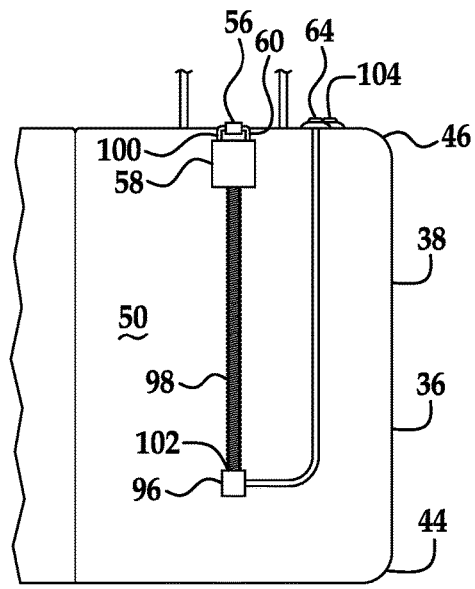
FIG. 12 is a rear view of the seat of the passenger cabin having a third embodiment of the restraint system.
Figure 13:
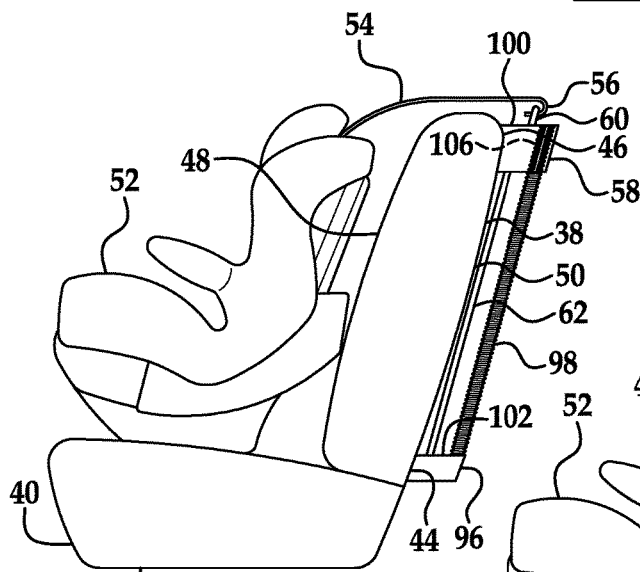
FIG. 13 is a side view of the seat with the tether attachment bracket of the third embodiment of the restraint system in the first position.
Figure 14:
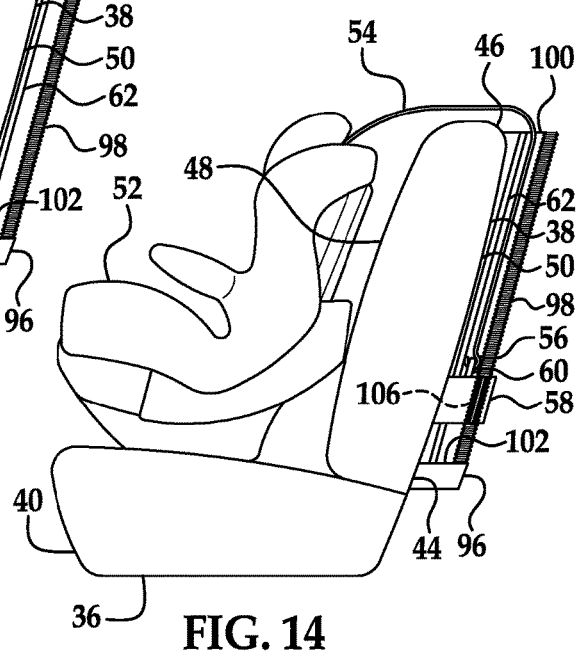
FIG. 14 is a side view of the seat with the tether attachment bracket of the third embodiment of the restraint system in the second position.

FIGS. 12-14 illustrate a third embodiment of the restraint system. The third embodiment includes a motor 96 drivably connected to a worm gear 98 for moving the tether attachment bracket 58 between the first and second positions.

The worm gear 98 may be engaged with the tether attachment bracket 58. The worm gear 98 may have a cylindrical shape with a spiral groove. The tether attachment bracket 58 may include a mating section 106 having grooves mateable with the spiral groove of the worm gear 98. The worm gear 98 may extend from the second position to the first position of the tether attachment bracket 58.

The worm gear 98 may be attached to a first worm-gear anchor 100 and a second worm-gear anchor 102. The first worm-gear anchor 100 is fixed to the seatback 38 and located near the first position of the tether attachment bracket 58 such that when the tether attachment bracket 58 is in the first position, the tether attachment bracket 58 abuts the first worm-gear anchor 100. The second worm-gear anchor 102 is fixed to the seatback 38 and located near the second position of the tether attachment bracket 58 such that when the tether attachment bracket 58 is in the second position, the tether attachment bracket 58 abuts the second worm-gear anchor 102.

The track 62 extends between the first worm-gear anchor 100 and the second worm-gear anchor 102. The track 62 may be parallel to the worm gear 98. The track 62 may be a guide rail, such as a cylinder. The track 62 may be mateable to a hole through the tether attachment bracket 58.

The motor 96 is drivably connected to the worm gear 98. The motor 96 may be attached to the first worm-gear anchor 100 or to the second worm-gear anchor 102, as shown in FIGS. 12-14. The motor 96 may be an electric motor. The motor 96 may be operable to rotate the worm gear 98 in either of two directions, that is, clockwise or counterclockwise. The motor 96 may have a stall torque, in other words, a torque at which the rotational movement of the motor 96 is zero. The stall torque may be a maximum torque that the motor 96 is able to impart to the worm gear 98.

The third embodiment may include the button 64 and a second button 104. Pushing one of the buttons 64, 104 to the depressed position may cause the other of the buttons 64, 104 to move to the undepressed position. Alternatively, the third embodiment may include a switch (not shown) having three positions. The buttons 64, 104 or the switch may be in electrical communication with the motor 96.

Pushing the button 64 into the depressed position or moving the switch to a first position causes the motor 96 to operate in a direction, e.g., counterclockwise, rotating the worm gear 98 and pushing the tether attachment bracket 58 toward the first position. Pushing the second button 104 or moving the switch to a second position causes the motor 96 to operate in the opposite direction, e.g., clockwise, rotating the worm gear 98 and pushing the tether attachment bracket 58 toward the second position. As the tether attachment bracket 58 moves to the second position, the top tether 54 becomes taut and resists further motion, requiring more torque from the motor 96. Once the motor 96 reaches the stall torque, the motor 96 stops rotating the worm gear 98. The stall torque of the motor 96 may be chosen to approximate the torque required to impart an appropriate tension to the top tether 54 to keep the child seat 52 in place. When both buttons 64, 104 are in the undepressed position or the switch is in a third position, the motor 96 remains still and does not rotate the worm gear 98.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
   a seatback having a top end portion;
   a retainer attached to the top end portion;
   a tether attachment bracket movable between a first position retained by the retainer and a second position below the first position along the seatback; and
   a spring coupled to the seatback and the tether attachment bracket and biasing the tether attachment bracket away from the first position to the second position.

2. The restraint system of claim 1, further comprising a seat bottom coupled to the seatback, wherein the seatback has a back side facing away from the seat bottom, and the tether attachment bracket in the second position is disposed alongside the back side of the seatback.

3. The restraint system of claim 1, wherein the tether attachment bracket has a U-hook.

4. The restraint system of claim 1, further comprising a retractor coupled to the seatback, and webbing coupled to the retractor and to the tether attachment bracket.

5. The restraint system of claim 4, wherein the spring is a torsion spring coupled to the retractor.

6. The restraint system of claim 5, wherein the retractor has a locked state preventing extraction of the webbing and an unlocked state allowing extraction of the webbing.

7. The restraint system of claim 6, further comprising a button attached to the top end portion of the seatback and in communication with the retractor.

8. The restraint system of claim 7, wherein the button has a depressed position and an undepressed position, the button in the depressed position switches the retractor to the unlocked state, and the button in the undepressed position switches the retractor to the locked state.

9. The restraint system of claim 8, wherein the retractor includes a spool about which the webbing is wound, a ratchet fixed to the spool, and a pawl in communication with the button and movable between an engaged position against the ratchet and a disengaged position spaced from the ratchet.

10. The restraint system of claim 9, further comprising a Bowden cable connecting the button to the pawl.

11. The restraint system of claim 1, further comprising a track extending from the retainer along the seatback.

12. The restraint system of claim 11, wherein the tether attachment bracket includes a carriage that is slidable along the track.

13. The restraint system of claim 12, further comprising a pin connected to and retractable relative to the carriage.

14. The restraint system of claim 13, wherein the track includes a plurality of slots sized to receive the pin.

15. The restraint system of claim 14, wherein the spring is a linear spring extending parallel to the track.

16. The restraint system of claim 15, further comprising a button attached to the top end portion of the seatback and in communication with the pin.

17. The restraint system of claim 16, wherein the button has a depressed position and an undepressed position, the pin is movable between a retracted position and an extended position relative to the carriage, the button in the depressed position moves the pin to the retracted position, and the button in the undepressed position moves the pin to the extended position.

18. The restraint system of claim 17, further comprising a Bowden cable connecting the button and the pin.

19. A restraint system comprising:
   a seatback having a top end portion;
   a retainer attached to the top end portion;
   a tether attachment bracket movable between a first position retained by the retainer and a second position below the first position along the seatback;
   a spring coupled to the seatback and the tether attachment bracket and biasing the tether attachment bracket to the second position;
   a retractor coupled to the seatback; and
   webbing coupled to the retractor and to the tether attachment bracket.

20. The restraint system of claim 19, wherein the spring is a torsion spring coupled to the retractor.

* * * * *